Oct. 29, 1963        J. W. BALDWIN         3,108,299
                  AUTOMOBILE TIRE WASHER
Filed March 19, 1962                     2 Sheets-Sheet 1

JOHN W. BALDWIN
    INVENTOR.

BY Mason & Graham

ATTORNEYS

Oct. 29, 1963     J. W. BALDWIN     3,108,299
AUTOMOBILE TIRE WASHER
Filed March 19, 1962     2 Sheets-Sheet 2

JOHN W. BALDWIN
INVENTOR.

BY

ATTORNEYS

ID
3,108,299
AUTOMOBILE TIRE WASHER
John W. Baldwin, 108 S. Cordova, Alhambra, Calif.
Filed Mar. 19, 1962, Ser. No. 180,740
7 Claims. (Cl. 15—21)

This invention has to do with an apparatus for washing automobile tires.

So-called whitewall automobile tires embodying a circular white band on the outer sidewall of the tire are customarily coated at the factory with a material designed to protect the white sidewall portion and keep it clean until it reaches the ultimate purchaser.

The coating detracts from the appearance of the tire and must be removed by the dealers when the tire is installed on an automobile. While the coating can be removed by hand by scrubbing with water and a soap or detergent, this is laborious and time consuming and is inefficient where a large number of tires are installed daily.

An object of the invention is to provide novel apparatus for automatically cleaning the outer sidewall of a tire to remove the protective coating after the tire has been mounted on an automobile wheel but prior to installation of the wheel on the automobile.

More particularly it is an object to provide a machine which supports and rotates a tire, preferably one mounted on an automobile wheel, and washes it in an enclosure or housing.

A further object is to provide such a machine or apparatus which can accommodate tires of all standard sizes.

Another object is to provide a fully automatic machine, that, once the tire has been placed in the machine, and the machine started, the washing and drying of the tire is automatically accomplished.

These and other objects will be apparent from the drawings and the following description. Referring to the drawings.

More particularly describing the invention I provide a base 11 which is closed by walls 12 on each side and by end walls 13. The base also has a short top wall 14 at one side. As will later appear the base is hollow and may be constructed in any suitable manner so as to act as a reservoir for wash liquid that runs off the tire during the washing operation.

Figure 2:
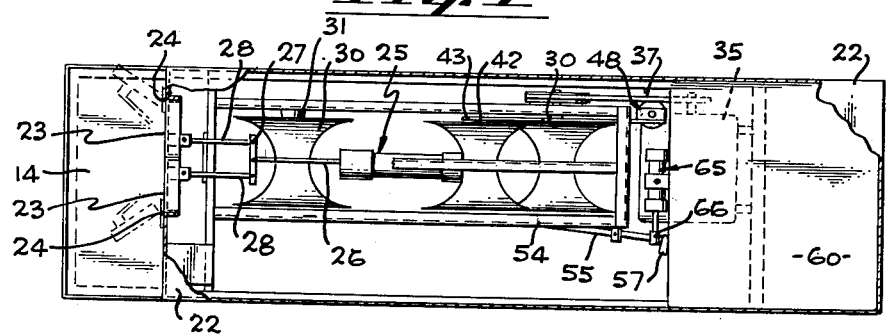
FIG. 2 is a plan view of the apparatus of FIG. 1 with the upper wall of the casing broken away.

A superstructure or upper casing 17 is provided on the base and this houses most of the apparatus for washing the tire. It may include the frame or framework 18, side walls 19, end walls 20 and 21 and a top wall 22. This upper casing is provided with a pair of doors 23 in the end wall 21 and these are hingedly mounted at 24 to swing outwardly upon vertical axes as shown in broken lines in FIG. 2. To operate the doors I provide a piston cylinder assembly designated generally 25 which may be pneumatically operated. The piston rod 26 of this assembly is attached to a crosshead 27 and this in turn carries a pair of operating rods 28 which are pivotally attached at one end to the crosshead and pivotally secured at their other ends to the doors respectively.

Within the casing I provide a pair of tire supporting rollers, designated 30, and these are shown mounted upon the frame 18 on stub shafts 31 and may include suitable bearings 32. The peripheral surfaces 33 of the rollers are preferably concave for the purpose of centering tires of different sizes. One of the rollers is driven by a motor 35 which is mounted upon a portion 36 of the frame, a belt 37 extending around a motor sheave 38 and a sheave 39 on the roller.

Figure 1:
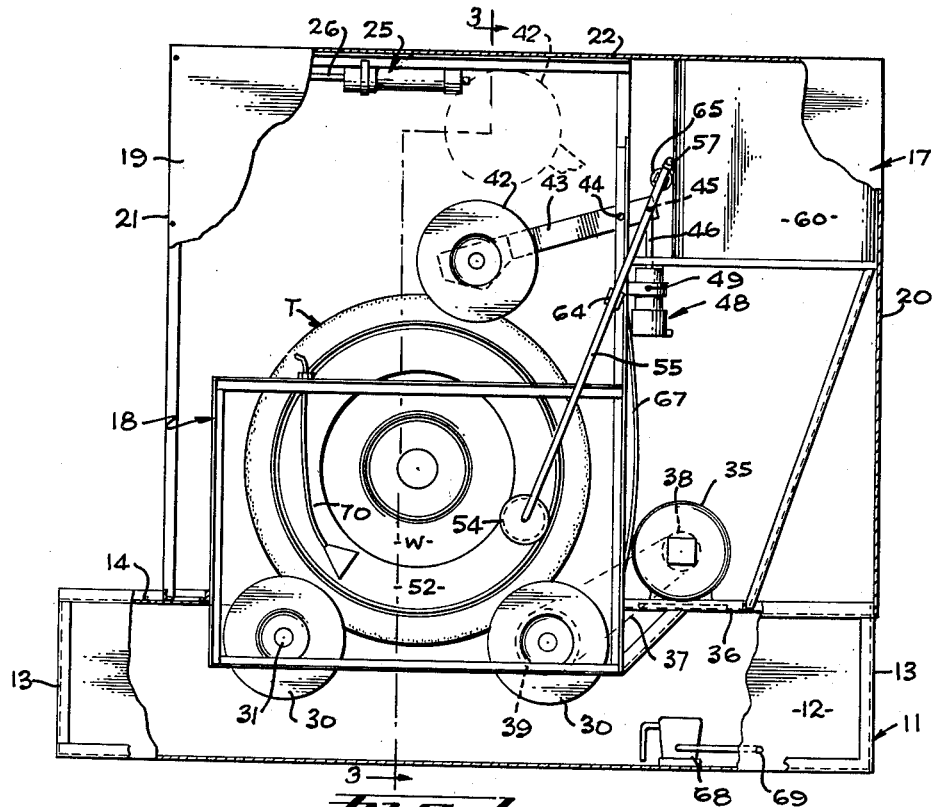
FIG. 1 is a side elevational view of apparatus embodying the invention with the casing broken away.

As will be apparent from FIG. 1, the tire to be washed, designated T, and preferably mounted upon a wheel, designated W, is shown cradled and supported by the two rollers 30. For the purpose of holding the wheel and tire down and in vertical position upon the rollers 30 I provide an upper roller 42 which can be raised and lowered and this is mounted upon a lever 43 which is pivotally mounted at 44. The lever is connected pivotally at 45 to the piston rod 46 of a piston cylinder assembly 48 which in turn is pivotally mounted at 49. With this arrangement the roller 42 may be raised to the broken line position thereof shown in FIG. 1 for insertion and removal of the tire and wheel and may be lowered into firm pressure engagement with the upper surface of the tire to hold it in place during the washing operation. Also since the roller 42 can be raised and lowered, tires of different sizes can be accommodated.

For the purpose of washing the side of the tire, particularly the white band portion 52 thereof, I provide a scrubbing implement such as a brush 54 which is carried on the end of a pipe, tube, or hollow arm 55. The latter is open at its lower end to discharge liquid between the bristles of the brush and is connected at its upper end by a hose 57 to an outlet pipe 58 of a tank 60. The latter may contain hot water. Adjacent the tank I provide a container 61 for a detergent and this is connected by pipe 62 to pipe 58, a solenoid valve 63 being provided to control release of detergent.

For the purpose of moving the brush into and out of engagement with the side of the tire, I mount the pipe at 64 for limited pivotal movement and provide a piston cylinder assembly 65 which is connected at 66 with the upper end portion of the pipe. The assembly 65 is carried by the frame.

A splash plate or partition 67 is positioned transversely of the machine to protect the motor. A motorized scavenger pump 68 is preferably provided in the bottom of the base portion to pump out the waste liquid through an outlet 69.

Since automobile service stations and tire dealers normally have a supply of compressed air, it is convenient to operate the various piston cylinder assemblies of the apparatus by such means and also to use this to dry or partially dry the tire. In this latter connection I provide an air outlet pipe 70 through which air under pressure may be passed to blow against the side of the tire during the final cycle of operation.

Figure 5:
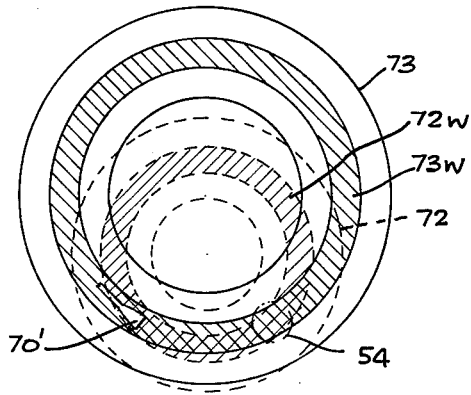
FIG. 5 is a diagrammatic view illustrating the position of the brush.

The brush 54 (or other scrubbing element) should be so located as to scrub the white band portion of any standard size tire. Thus, referring to FIG. 5, I show diagrammatically the brush 54 located at the intersection of the white wall bands 72W and 73W of the tires 72 and 73, the tires representing the smallest and largest tires accommodated by the machine. Also, the outlet 70' of the air pipe 70 should be similarly located at the other area of intersection.

Figure 4:
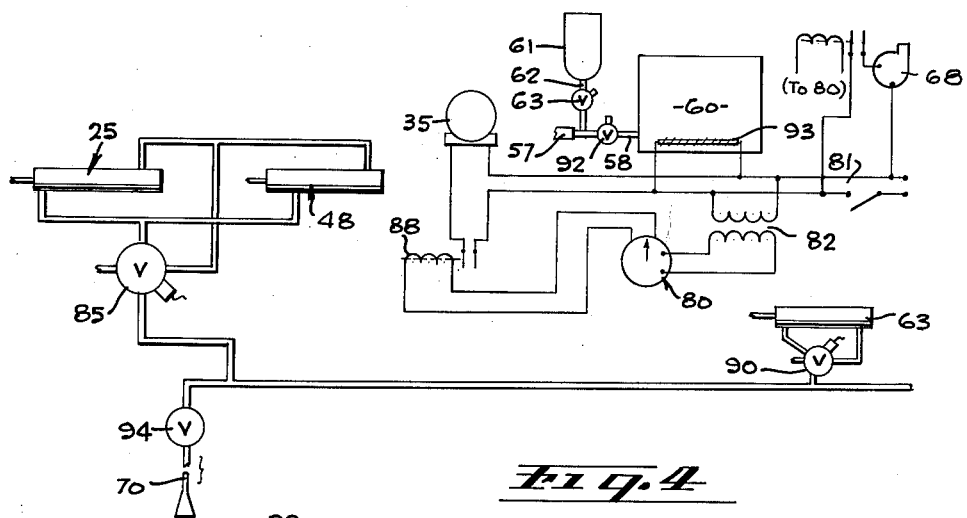
FIG. 4 is a diagrammatic view of the electrically and pneumatically operated components of the apparatus.
Figure 3:
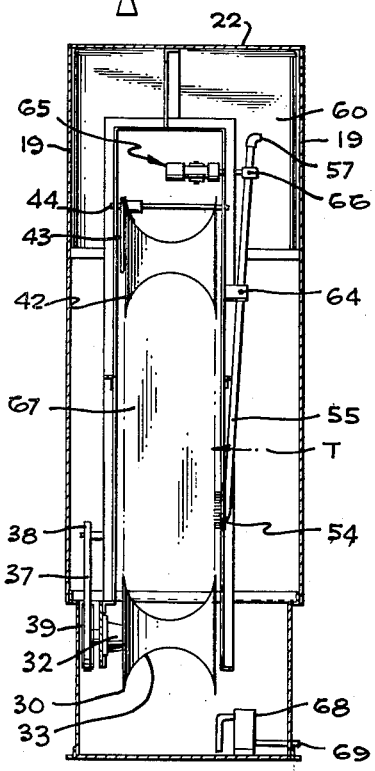
FIG. 3 is a vertical sectional view on line 3—3 of FIG. 1.

Referring now to FIG. 4, I prefer to have the apparatus function automatically once it has been set in operation and therefore, by way of example, I show an electric control unit designated 80 in the nature of a multiple timer switch which operates automatically once it is started. This may be connected electrically to receive a suitable source of current from an A.C. line 81 through a transformer 82. I provide a solenoid operated valve 85 which may control both the door operating piston cylinder assembly 25 and the upper roller piston cylinder assembly 48. Thus when the doors 23 are open, which is the normal position thereof when the machine is not in operation, a tire may be inserted by rolling it through the opening between the doors and onto the rollers 30. The controller 80 may then be set in operation manually to sequentially operate the various electropneumatic components of the apparatus. When the controller 80 actuates valve 85, the doors close and the upper roller moves into engagement with the tire. Subsequently the motor may start, and for this purpose I show a relay circuit 88 associated with the controller 80. After the motor has begun to rotate the tire, the solenoid valve 90 controlling the piston cylinder 63 which operates the brush may be actuated to cause the brush to engage the side of the tire. At approximately the same time a solenoid valve 92 may be operated to supply water from tank 60 to the brush. Also, for a limited time, detergent may flow through valve 63.

As shown in the diagram the liquid in the tank may be heated electrically by a heater 93. After a sufficient interval the brush retracts and the water or liquid supplied thereto is shut off, at which time the air may be supplied through pipe 70 and the controlling solenoid valve 94 to dry or partially dry the side of the tire. Subsequently the air is turned off, the motor deenergized and, after the tire stops rotating, the upper roller is raised and the doors opened. The tire may then be manually removed from the machine. During the time the water is running, the scavenger pump 68 may be operated.

Although I have shown and described a preferred form of my invention, I contemplate that various changes and modifications can be made therein without departing from the invention, the scope of which is indicated by the claims which follow. By way of example the various piston-cylinder units have been shown and described as double-acting, however, these may be single-acting with spring return means incorporated therein or associated therewith.

I claim:

1. In a machine for washing the side wall of an automobile tire, a housing providing a chamber for receiving a tire to be washed, means within the housing for supporting the tire for rotation, means for rotating the supported tire, brush means engageable with the side wall of the tire to be washed, means for delivering liquid to the side wall of the tire, said housing having an opening for insertion and removal of the tire, door means for said opening hingedly mounted on said housing, and automatic means for closing said door means and operating the tire rotating means, the brush means and the liquid delivery means in a timed, predetermined sequence.

2. In a machine for washing the side wall of an automobile tire, a housing providing a chamber for receiving a tire to be washed, a pair of tire-supporting rollers mounted within said housing for supporting the tire for rotation, motor means for driving one of said rollers, a third roller mounted to engage the tire above said pair of rollers, brush means engageable with the side wall of the tire to be washed, means for delivering liquid to the side wall of the tire, said housing having an opening for insertion and removal of the tire, door means for said opening hingedly mounted on said housing, and automatic means for operating said door means, said motor means, said brush means, and said liquid delivery means in a timed, predetermined sequence.

3. In a machine for washing the side wall of an automobile tire, a housing and frame means defining a base portion adapted to serve as a container for receiving waste wash water and an upper position to receive a tire to be washed, a pair of lower rollers adapted to support a tire in upright position for rotation, a third roller mounted to engage the tire above said lower rollers, motor means for driving one of said rollers, means for firmly holding said upper roller in engagement with a tire supported on said lower rollers, a tire scrubbing element mounted in said housing and frame means for positioning in or out of engagement with a tire, powered means for positioning said scrubbing element in engagement with a tire, a tank for holding a supply of wash liquid, valve-controlled conduit means for supplying liquid to the tire, and scavenger pump means for removing waste liquid from said base portion of the housing and frame means.

4. The machine set forth in claim 3 in which automatic means is provided for coordinating said motor means, said powered means and said valve-controlled conduit means for operation in a predetermined sequence.

5. In a machine for washing the side wall of an automobile tire mounted on a wheel but free of an automobile, a frame, a pair of aligned lower rollers mounted on said frame for rotation on parallel, laterally spaced axes and adapted to support the tire in upright position, the spacing of said rollers being less than the diameter of the tire, motorized means for rotating at least one of said rollers, a third roller above, and in alignment with said pair of rollers, means mounted on said frame and supporting said third roller for rotation upon an axis parallel to the axes of rotation of said pair of rollers, said last-mentioned means being movable to position said third roller in engagement with a tire supported on said pair of rollers or out of engagement with such a tire, power means for so moving said third roller support means, an elongated arm mounted on said frame for pivotal movement about an axis substantially normal to the axes of rotation of said rollers, a tire-scrubbing element carried by said arm, and power-operated means for pivoting said arm to position the tire-scrubbing element against a tire supported by the rollers or to position the same out of engagement with the tire.

6. The machine set forth in claim 5 in which said scrubbing element is so mounted as to engage the side wall of a tire at a region in space with reference to said pair of rollers where the white side bands of the largest and smallest tires accommodated by the machine intersect.

7. The machine set forth in claim 5 in which said arm comprises an open ended tube and in which means is provided for supplying said tube with a washing liquid.

References Cited in the file of this patent

UNITED STATES PATENTS

| | | |
|---|---|---|
| 1,924,005 | Stevens | Aug. 22, 1933 |
| 2,716,767 | Davis | Sept. 6, 1955 |
| 2,800,671 | Mowak | July 30, 1957 |
| 2,857,605 | Weishaar | Oct. 28, 1958 |
| 2,989,262 | Hornbostel | June 20, 1961 |
| 3,012,334 | Davis | Dec. 21, 1961 |
| 3,064,915 | Hornstein et al. | Nov. 20, 1962 |